(12) United States Patent
Kwong

(10) Patent No.: US 8,890,905 B2
(45) Date of Patent: Nov. 18, 2014

(54) REFLECTORS WITH SPATIALLY VARYING REFLECTANCE/ABSORPTION GRADIENTS FOR COLOR AND LUMINANCE COMPENSATION

(75) Inventor: Vince Kwong, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 146 days.

(21) Appl. No.: 13/388,421

(22) PCT Filed: Jul. 26, 2010

(86) PCT No.: PCT/US2010/043185
§ 371 (c)(1),
(2), (4) Date: Feb. 1, 2012

(87) PCT Pub. No.: WO2011/022170
PCT Pub. Date: Feb. 24, 2011

(65) Prior Publication Data
US 2012/0133689 A1    May 31, 2012

Related U.S. Application Data

(60) Provisional application No. 61/234,848, filed on Aug. 18, 2009.

(51) Int. Cl.
*G09G 5/10* (2006.01)
*G02F 1/1335* (2006.01)

(52) U.S. Cl.
CPC .... *G02F 1/133609* (2013.01); *G02F 1/133605* (2013.01); *G02F 1/133611* (2013.01); *G02F 1/133603* (2013.01)
USPC .......................................................... 345/690

(58) Field of Classification Search
USPC .......................................................... 345/690
See application file for complete search history.

(56) References Cited

U.S. PATENT DOCUMENTS

| | | |
|---|---|---|
| 2004/0111035 A1* | 6/2004 | Kondoh et al. ............... 600/500 |
| 2009/0322800 A1 | 12/2009 | Atkins |
| 2010/0231806 A1 | 9/2010 | Kuromizu |

FOREIGN PATENT DOCUMENTS

| | | |
|---|---|---|
| EP | 1650730 | 4/2006 |
| EP | 2161492 | 3/2010 |
| EP | 2204603 | 7/2010 |
| WO | 2009004840 | 1/2009 |
| WO | 2009050916 | 4/2009 |
| WO | 2009054083 | 4/2009 |

* cited by examiner

*Primary Examiner* — Fred Tzeng

(57) ABSTRACT

A Point Spread Function (PSF) of a light source is controlled by the provision of a PSF modifier on a reflector at or near the light source. The modifier may be a gradient or spatially varying application of any of transmission holes, filters, and absorptive dots. The invention may be applied to displays (e.g., backlighting of displays), and arrangement of the modifiers may include patterns that vary according to artifacts occurring in the display. The PSF modifier may flatten, remove, or increase tails, or mitigate fringing colors or patterns. In backlight arrays, the PSF modifier may be similar for all centrally located light sources, and exhibit differences when applied to light sources near edges or other anomalies in the backlight or surrounding structure.

16 Claims, 13 Drawing Sheets

US 8,890,905 B2

REFLECTORS WITH SPATIALLY VARYING REFLECTANCE/ABSORPTION GRADIENTS FOR COLOR AND LUMINANCE COMPENSATION

CROSS-REFERENCE TO RELATED APPLICATIONS

This application claims priority to U.S. Patent Provisional Application No. 61/234,848, filed 18 Aug. 2009, hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to light and light sources. More particularly, the invention may be applied to backlighting of LCD and multi-modulation display systems.

2. Discussion of Background

Light sources are utilized for a variety of purposes. Light sources for displays typically include, for example, lamps for illuminating projection modulators and backlighting (such as CFLs or modulated array backlighting) of LCD panels.

SUMMARY OF THE INVENTION

The present inventor has realized the need and now provides invention as described herein to modify a Point Spread Function (PSF) of a light source so as to provide a PSF more desirable for its intended purpose. For example, the invention may comprise, for example, a gradient/spatial color compensation rear reflector for improved luminance and/or color in a display or another product with lighting. In addition the invention may provide gradient/spatial compensation edge reflectors for color and/or luminance in the same.

In one embodiment, the present invention provides a display, comprising, a spatial modulator, and, a backlight comprising at least one light source and a reflector configured to illuminate the spatial modulator, wherein the reflector comprises a compensation mechanism that modifies a PSF of the backlight. The compensation mechanism may comprise, for example, any of holes, reflectors, and absorptive dots or filters in/on the reflector. The dots themselves may also be reflective (higher reflection than the rest of the reflector). The type of reflection can range from specular (glossy, mirror-like reflection) to Lambertian (diffuse spreading, paper-like reflection) and/or a combination of these two types of reflection. The dots also don't necessarily need to be dots, they could be other shapes such as stripes, ellipses, other geometric, or non-geometric shapes, etc. The compensation mechanism, may be, for example, positioned so as to surround the light source. Surrounding the light source may be either a symmetrical arrangement (e.g., center of a backlight array) or non-symmetrical (e.g., an edge or corner of a backlight array).

In various embodiments the holes, dots, absorptive filters or reflectors may be of varying sizes. Preferably, the compensation mechanism is spatially varying. The spatially varying compensation may comprise, for example, compensation for artifacts or other anomalies in a structure of a backlight, reflector, or other components of the display.

In various embodiments, the compensation mechanism causes a reduction in tails of the PSF. A compensation mechanism may also be utilized that causes an expansion in the tails of the PSF (e.g., via the use of higher reflection dots), which may be useful, for example, in the corner cases. In one embodiment, the light source comprises multiple colors and the compensation mechanism comprises multiple light absorptive filters. The light source may comprise, for example, red, green, and blue LEDs and the filters comprise yellow, magenta, and cyan filters. The filters may be, for example, spatially varied and positioned to absorb red, green, and blue fringing of the light source.

In another embodiment, the invention provides a light source reflector comprising a spatially varying PSF modifier. The spatially varying reflector may be, for example, on a side or a corner of a backlight of a display. The spatially varying PSF modifier may comprise, for example, at least one of holes through a surface of the reflector, light absorptive (or reflective) dots disposed on the reflectors, and color specific absorptive filters disposed on the reflector.

In another embodiment, the invention provides a backlight comprising an array of light sources each comprising a PSF modifier. The PSF modifier comprises, for example, a spatially varying set of color filters. The spatially varying color filters may be positioned, for example, in fringing areas near the light sources and a predominate color of a particular fringing area corresponds to an absorptive color of the filter in the particular fringe area. The light sources may comprise, for example, LEDs, and the PSF modifier may comprise at least one of a light absorbing dot and a light reflective dot positioned on or over the LED so as to modify a PSF of each LED.

In various embodiments, the PSF modifier flattens a PSF of each light source. In the event a PSF needs to be sharpened (e.g., in the case where an LED output is too flat or where there is too much diffusion when the light interacts with one or more optical films), the PSF modifier may be configured to sharpen the PSF of one or more light sources.

In one embodiment, the PSF modifier may comprise, for example, a spatially varying set of holes arranged in reflectors surrounding the light sources.

In another embodiment, the present invention provides a display, comprising a backlight comprising a spatially varying reflector. The spatially varying reflector may be, for example, positioned at least one of a corner and an edge of the backlight. The spatially varying reflector may comprise, for example, at least one of holes in reflectors around light sources of the backlight, light absorptive filters disposed in fringe areas of the light sources, and areas of reflectivity having greater reflectivity than an amount of reflectivity of the reflector in general.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The LED reflector acts to control the tails of the PSF by re-directing the light in a more forward direction. In some cases, the PSF becomes too sharply truncated which introduces perceptually visible optical artifacts through the LCD panel. The gradient/spatial luminance compensation LED reflector could controllably allow a minimum amount of light to pass beyond the LED reflector to reduce these optical artifacts without drastically affecting the PSF and hence the contrast of the display. In other cases, it may be necessary or desirable to drastically affect the PSF.

Figure 1A:
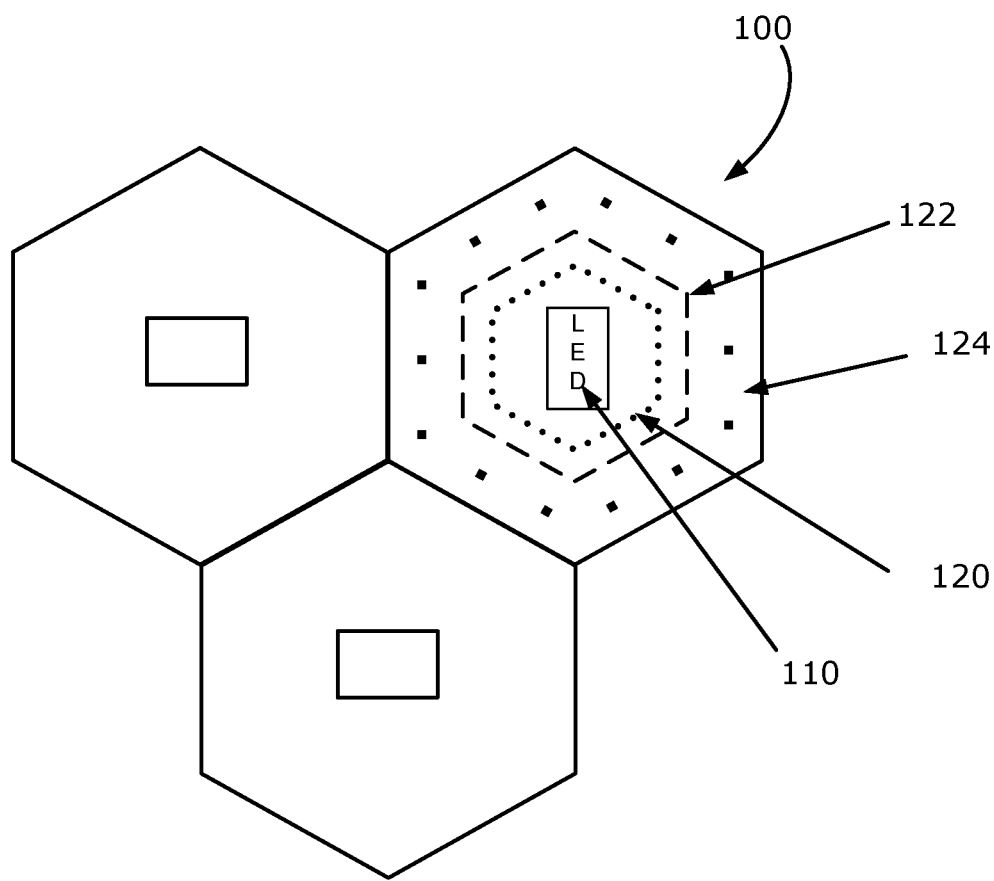
FIG. 1A is an illustration of a top view of an LED reflector with various gradient patterns according to various embodiments of the present invention.

Referring now to the drawings, wherein like reference numerals designate identical or corresponding parts, and more particularly to FIG. 1A thereof, there is illustrated a top view of LED reflector 100 with various gradient patterns. The reflector may be a multisided reflector (e.g., hexagon, or other geometry) including sides that reflect light in a generally uniform direction. The reflector may be, for example, a "flower" shape, or structurally arranged such as a reflector used for collimation as disclosed in U.S. patent application entitled "Method And Apparatus In Various Embodiments For HDR Implementation In Display Devices," Ser. No. 12/491,857, the contents of which are incorporated herein by reference in their entirety for all purposes. Regardless of the structure, the reflector according to the present invention includes a Point Spread Function (PSF) modification mechanism which improves the PSF of the LED 110 for its intended purpose.

The mechanism by which the PSF modification mechanism operates may be, for example, transmission holes in the reflector material. The transmission holes may be set-up, for example, such that light entering the holes is mainly extinguished or removed from the PSF of the LED. The removal of the light alters the PSF.

As illustrated in FIG. 1A, the transmission holes may take various shapes and/or sizes and/or positions on, for example, a reflector. Reflector 100 illustrates, for example, small circular transmission holes 120 close to the LED 110, medium transmission holes 122, and large transmission holes 124. The size/sizes of the transmission holes are chosen to provide the desired PSF or desired effect on the PSF. The transmission holes may be round, oval, ellipsoids, or other shapes. Although illustrated here as three different types/sizes of transmission holes, any particular design may have only one or a plurality of different types and sized transmission holes. As illustrated in FIG. 1A, the LED 110 and reflector 100 may be for example, may be part of a larger array. The larger array may be, for example, a matrix based locally dimmed backlight for a display, such as an LCD display.

Figure 1B:
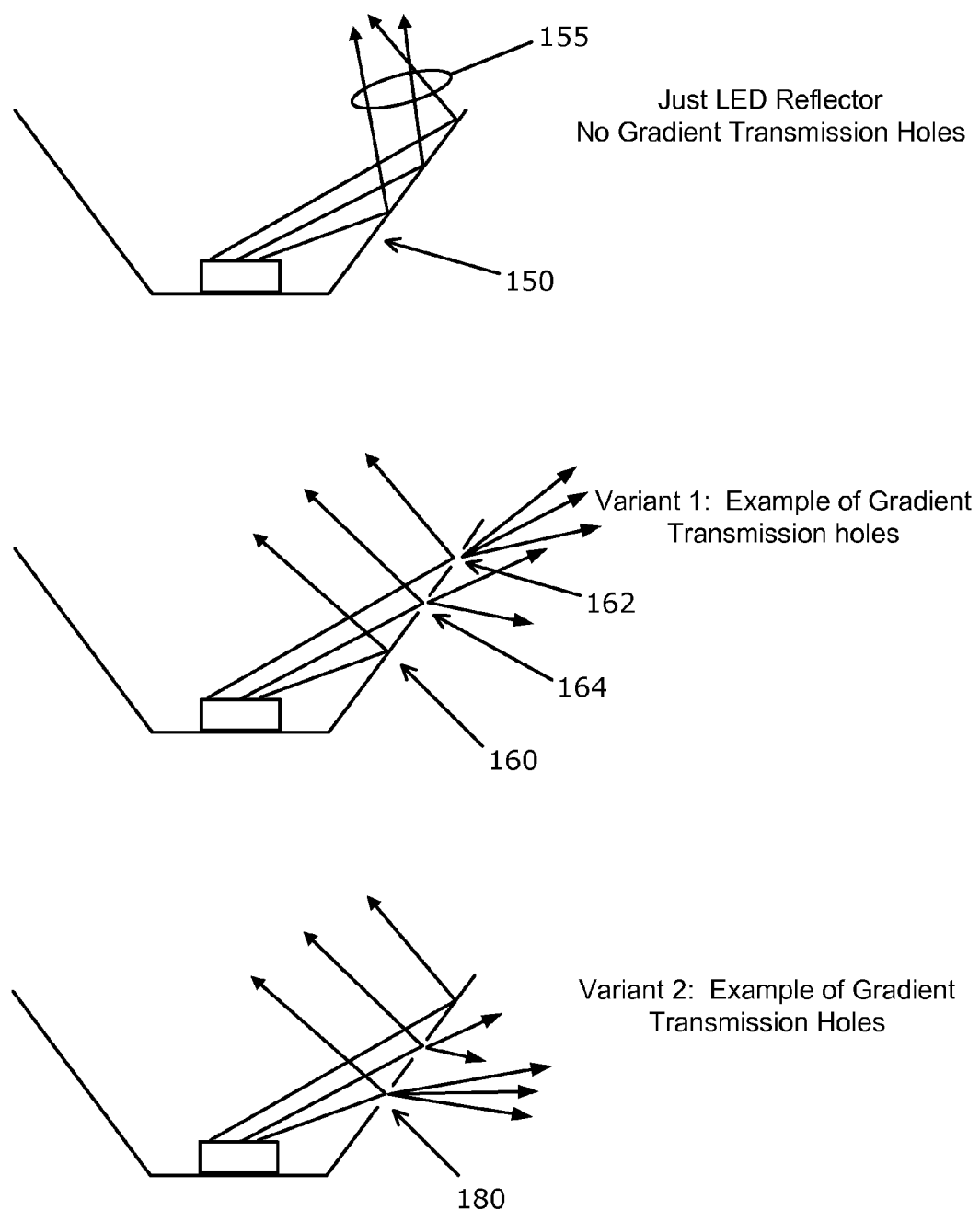
FIG. 1B is an illustration of a cross-sectional side view of an LED reflector example with various gradient patterns according to various embodiments of the present invention.

FIG. 1B is illustrated a cross-sectional side view of an LED reflector examples with various gradient patterns. LED reflector 150 illustrates an un-modified PSF reflector (an LED reflector without gradient transmission holes). All light generated by the LED (light rays 155), either directly or by reflection, is directed toward an intended target (e.g., a modulation panel, not shown). LED reflector 160 illustrates an example of gradient transmission holes comprising a larger transmission hole 162 near a far edge of the reflector, and a relatively smaller transmission hole 164 at approximately a half-way point on the reflector.

Other variants of the same design may only have one or more transmission holes of one or more shapes and/or sizes. There could also be reflective/absorptive dots on the flowers instead of (or in addition to) transmission holes. In yet another variant, an example of a reflector (180) is shown having gradient transmission holes comprising a relatively larger transmission holes closer to the LED and a smaller transmission holes further out on the reflector.

Although illustrated on only one side of the reflector, the transmission holes may comprise a symmetrical pattern surrounding the LED, and may, for example, comprise multiple hole locations on a same side of the reflector. In some embodiments, particularly near edges or corners of an array of LEDs and reflectors (e.g., a display backlight array) the pattern of transmission holes may vary and/or be non-symmetrical. Nonetheless, the objective of the holes is to control the PSF and make it a more desirable form.

Thus, the size, shape, gradient, spatial pattern, density and all other geometric parameters of holes can be altered to control the shape of the PSF. The angular walls of the LED reflector can also be changed to control the shape of the PSF (e.g., altering the tails or the symmetry of the PSF). This concept can be used to effectively adjust the PSF for all geometric layouts of LEDs (not just hexagonal packed as illustrated, but also for square/rectangular patterns).

Although the above techniques are applied to angled reflectors such as "flower" reflectors surrounding a light source, similar techniques can be applied to flat panel reflectors, vertical side reflectors, and other reflector configurations. Such techniques include a gradient/spatial luminance compensation rear reflector that may be embodied, for example, by using the gradient luminance compensation on a flat rear reflector.

In this case, the gradient patterns may be, for example, either transmissive holes or absorptive dots. The patterns may also take the form of stripes, ellipses, or other shapes. In these example embodiments, light that would normally be reflected is no longer reflected. Again, the size, shape, gradient, spatial pattern, density and all other geometric parameters of holes/dots can be altered to control the shape of the PSF. The degree of transmission or absorption can vary as well. In some embodiments, rather than absorptive dots or materials, the reflectors may include areas having a higher degree of reflectance than a remainder of the reflector. In one embodiment, the reflector may include both absorptive and more highly reflective areas.

In addition to affecting a PSF of the light source, the present invention also includes modification of the types of reflection that contribute to the PSF and overall illumination of the light sources. The type of reflection can range from specular to Lambertian and/or a combination of these two types of reflection. The reflective dots (and to a lesser extent qualities of absorptive dots and holes) are constructed to cause a desired type of reflection or mixture of reflection types. For example, an optical system utilizing an optical sheet whose performance is enhanced by specularly reflected light may be designed with reflective dots having known specular reflective properties and/or an appropriate mix of specular and Lambertian reflective properties. In addition to being a mix of different types of reflective dots, the invention may also be embodied as any combination of reflective dots, absorptive dots, and holes of different shapes, sizes, and/or reflective properties all spatially mixed together.

Figure 2A:
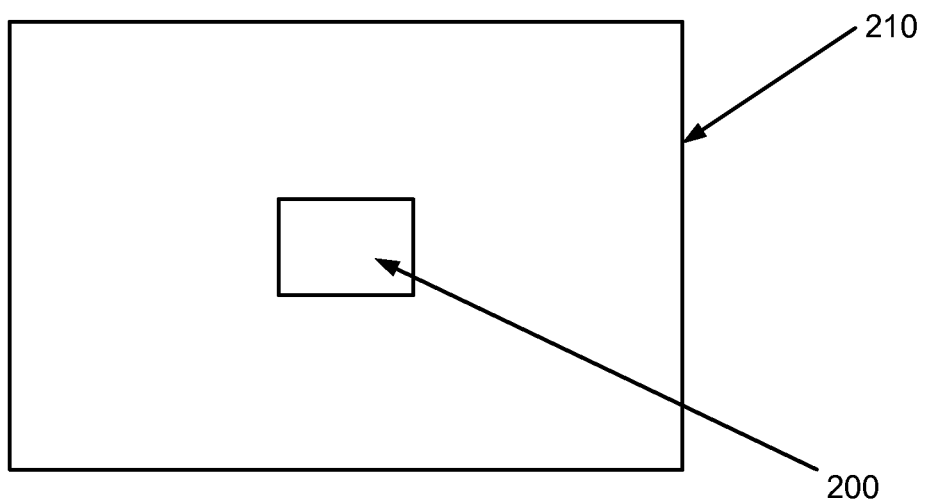
FIG. 2A is an illustration of an LED and reflector.
Figure 2B:
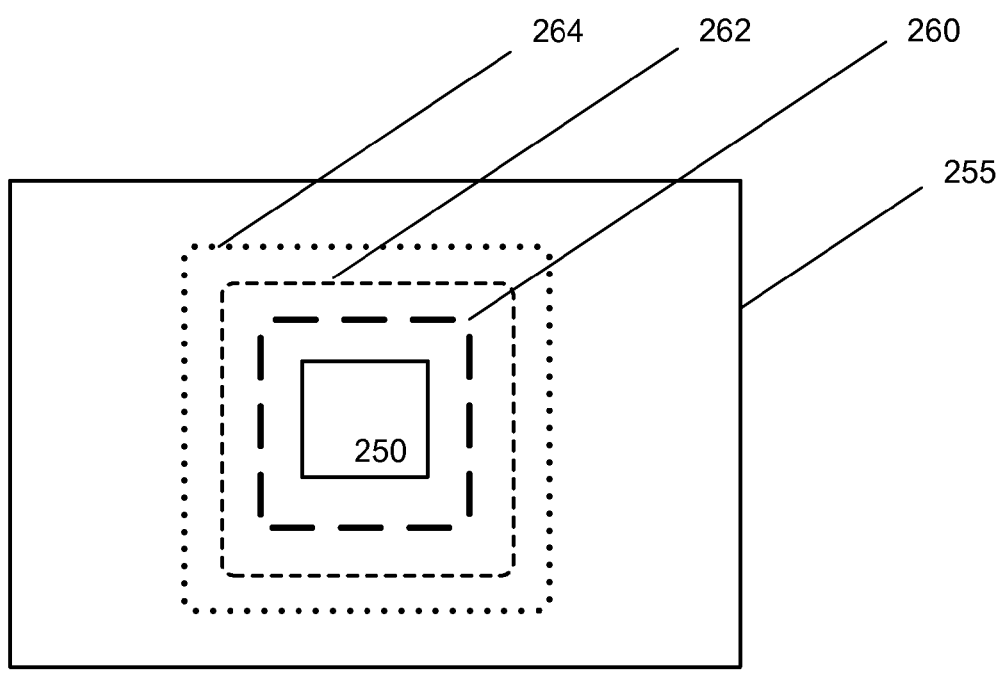
FIG. 2B is an illustration of an LED and ESR Rear Reflector with Gradient/Spatial Compensation according to an embodiment of the present invention.
Figure 3A:
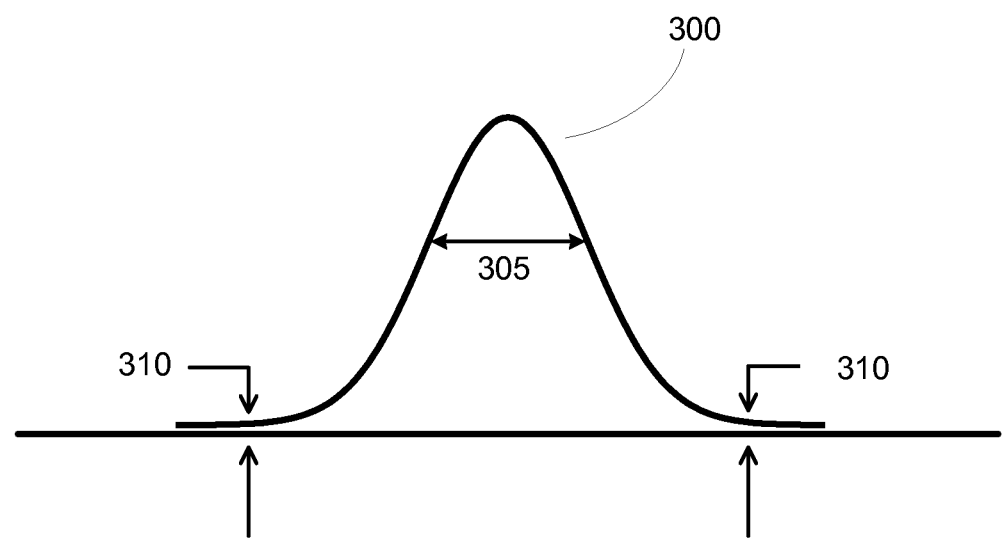
FIG. 3A is a drawing of a PSF corresponding to the LED and reflector of FIG. 2A.

The basic concepts are shown in FIGS. 2 and 3 as now described. FIG. 2A is a drawing of a typical LED 200 and reflector 210. A corresponding PSF 300 is illustrated in FIG. 3A. Of particular note are tails (e.g., tail 310) of the PSF which, although minimal compared to the overall PSF, may cause undesirable effects if not eliminated or controlled. Such effects include, for example, a cumulative lighting effect when a substantial number of light sources are arrayed as in, for example, a backlight of a locally dimmed dual modulation high dynamic range display.

FIG. 2B is an illustration of an LED 250 and ESR Reflector 255 with Gradient/Spatial Compensation according to an embodiment of the present invention. The compensation is illustrated in several forms, but any of which may be selectively applied either alone or in combination in any particular application. The illustrated compensation comprises, for example, large absorbing specs (or dots) 260 symmetrically surrounding LED 250. Further compensation occurs with additional symmetrical absorbing specs 262 and 264.

Figure 3B:
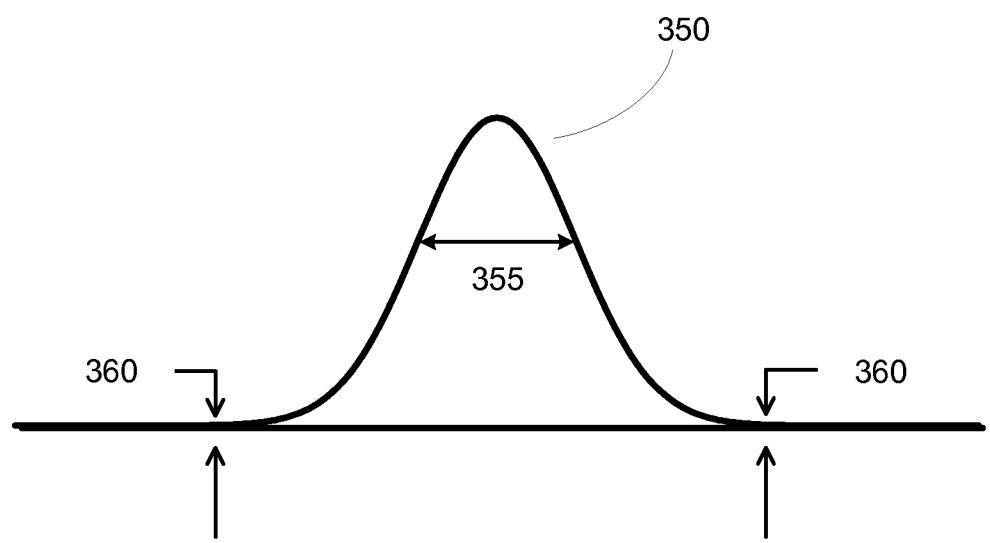
FIG. 3B is a drawing of a controlled PSF according to an embodiment of the present invention.

Non symmetric absorbing or reflecting gradient patterns may also be desirable. For example, one of the optical films (BEF) refracts light in only one plane, either vertically or horizontally. This causes the PSF from an LED with symmetric output to become non-symmetric. It will be elongated in one direction. Gradient dots may be utilized to create a non-symmetric reflection/absorption profile that compensates for the BEF effect, with the net result being a symmetric output. An exemplary controlled PSF 350 is illustrated in FIG. 3B which corresponds to the LED and reflector of FIG. 2B. Compared to PSF 300, the controlled PSF 350 is narrower because of the absorbing holes/dots in/on the ESR rear reflector. Tails 360 are reduced or eliminated compared to tails 310, as are any unintended or undesirable effects of the tails.

The invention may be further extended to, for example, a gradient/spatial color compensation rear reflector. In direct-view RGB LED displays, the discrete RGB LEDs are clustered together to maximize color overlap and color mixing but there still is color separation at the edges of the color-mixed RGB PSF. Even for single-packages, integrated 3-die RGB packages have physical separation of the 3 die, which causes color separation.

Figure 4:
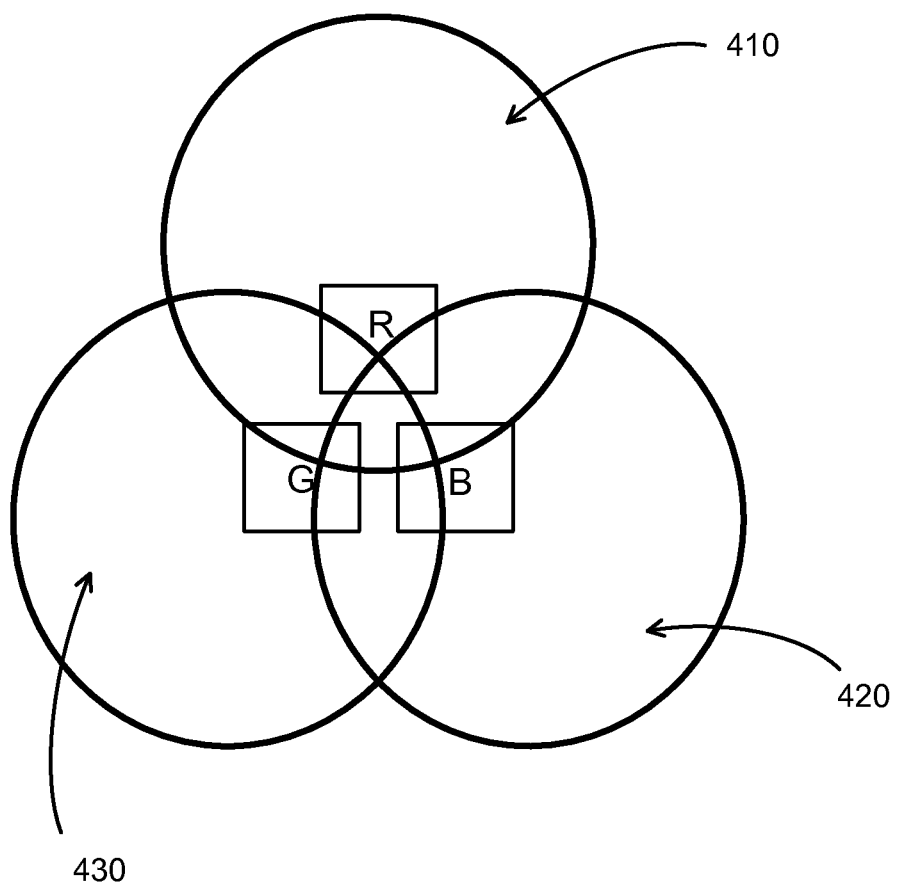
FIG. 4 is a drawing illustrating a physical die separation in an RGB LED that causes color fringing.

FIG. 4 is a drawing illustrating a physical die separation in an RGB LED that causes color fringing. As can be seen in the figure, areas of red illumination away from the green and blue dies will have a relatively stronger red component and exhibit red fringe (red fringing or color separation) 410. Likewise, blue fringing 420 occurs in areas of blue illumination away from the green and red dies, and green fringing 430 occurs in areas of green illumination away from the red and blue dies. Similar fringing would occur when using other arrangement of physically separated light sources, or different selections of light sources including different color systems (e.g., a yellow, magenta, cyan (YMC) system).

Figure 5:
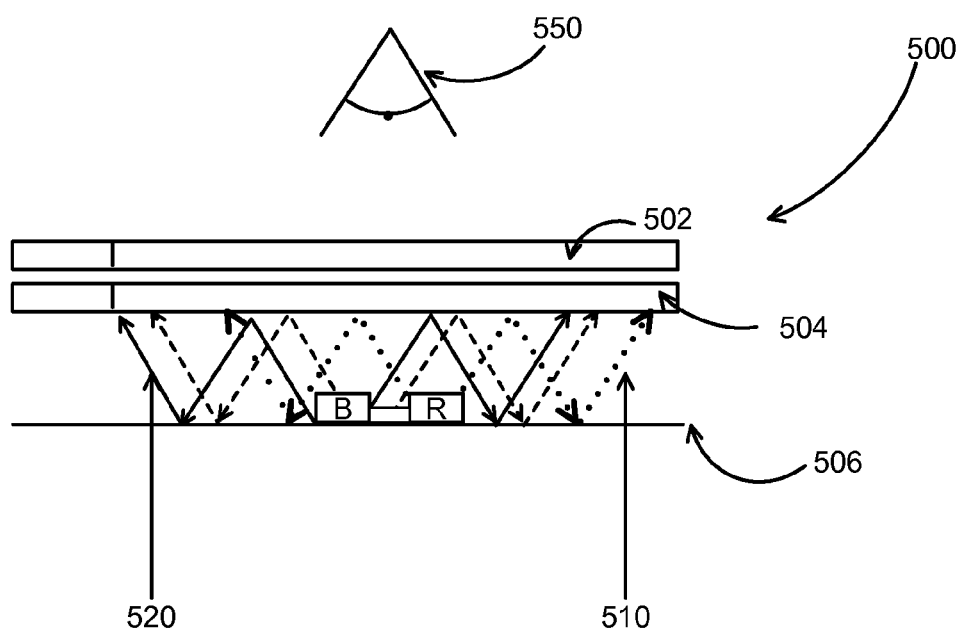
FIG. 5 is a drawing illustrating a ray tracing and fringes resulting from a multi-color LED package.

This color separation or fringing is a noticeable color artifact when viewed through a display. FIG. 5 illustrates a example ray tracing and fringes resulting from a multi-color LED package in a backlit LCD display 500. In the side view red and blue LED dies are shown. Corresponding red fringe 510 and blue fringe 520 are shown.

Figure 6A:
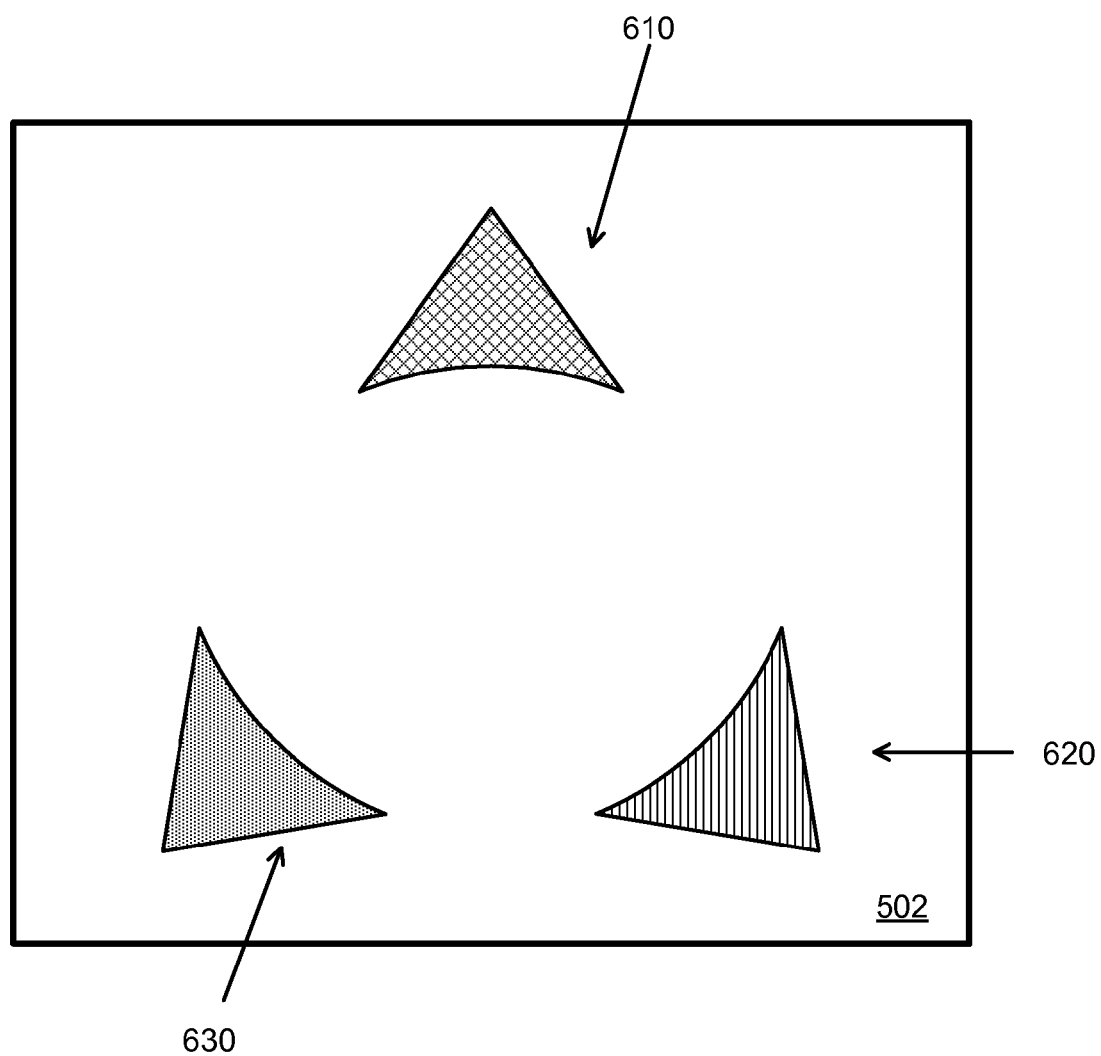
FIG. 6A is a drawing illustrating color fringing that appears through the LCD for a direct-RGB LED display.

The fringe areas are in a cavity between LCD 502/Diffuser 504 (e.g., DBER, BER) and ESR specular reflector 506 (e.g., ESR specular reflector) and illuminate the LCD 502/Diffuser 504 both directly and by reflection. An approximation of the fringe areas is illustrated in FIG. 6A. The red fringing 610, blue fringing 620, and green fringing 630 are shown as viewed on LCD 502 by viewer 550.

Figure 6B:
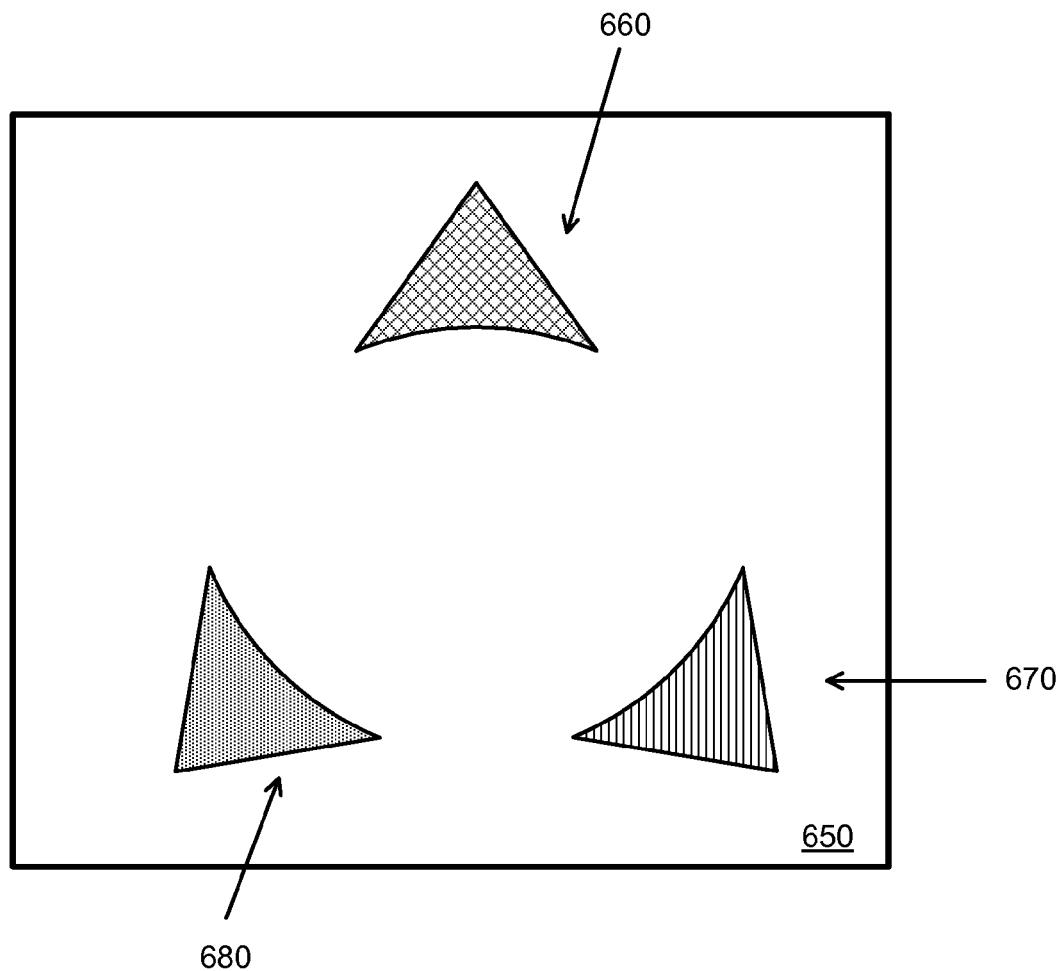
FIG. 6B is a drawing illustrating color compensation filters on a rear reflector according to an embodiment of the present invention.

The gradient/spatial color compensation rear reflector of the present invention may be utilized to reduce or eliminate fringing. As illustrated in FIG. 6B, gradient/spatially varying color absorption filters are placed, for example, on a reflector 650. The filters are placed so as to absorb the color fringes. For example, to absorb the red fringe, a cyan color filter (or reflector) 660 which absorbs red, causing red fringe to diminish or disappear, may be placed at a location where the red fringe occurs. Likewise a yellow filter/reflector 670 (absorbs blue, enough absorption to diminish or cause the blue fringe to disappear) and a magenta filter/reflector 680 (absorbs green so green fringe diminishes or disappears) are placed at blue fringe and green fringe areas respectively.

Since the luminance intensity of the color fringes may fall-off as a function of radial distance away from the LED, the correct filter may have a corresponding fall-off. This fall-off can be controlled by varying the absorption of the filter. This can be controlled by varying the density of the filter and/or by creating a spatial pattern of filter dots and varying the size, shape, gradient, spatial pattern, density and all other geometric parameters of these dots. In this way, not only are the color fringing effects reduced, but the shape of the PSF may also be controlled.

The filter characteristics may also be adjusted to compensate for regions where the color fringe is composed of two colors (e.g. yellow in the case where the green and red fringes begin to overlap). For example, in the yellow, or green/red fringe overlap, a spatial combination of cyan and magenta filters may be utilized.

Figure 7A:
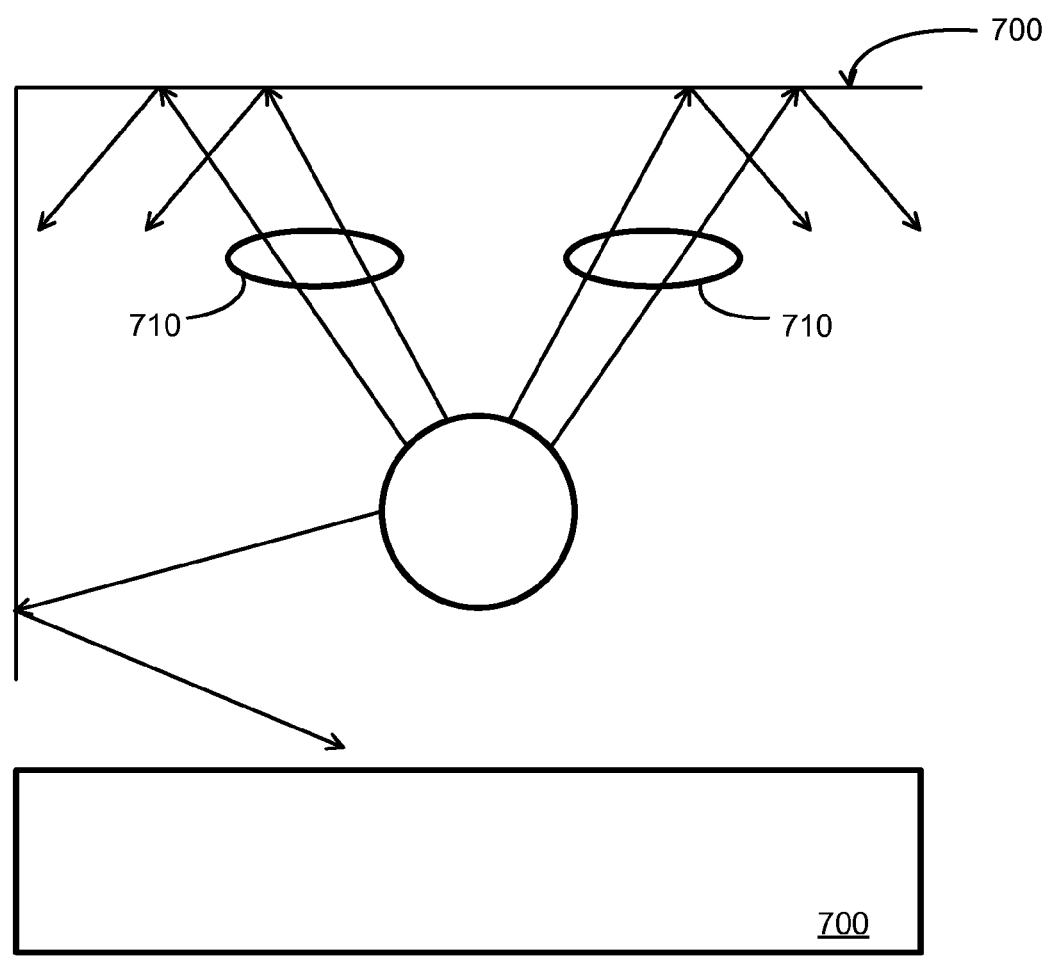
FIG. 7A is a drawing illustrating a regular ESR edge reflector.

The invention yet further includes gradient/spatial compensation edge reflectors for color and/or luminance compensation. The PSF at the edges of a display are different than the PSF at the center of the screen. This is due to the fact that the reflectance of the surroundings is different in the two cases. FIG. 7A is a drawing illustrating a regular un-patterned ESR edge reflector 700.

Figure 7B:
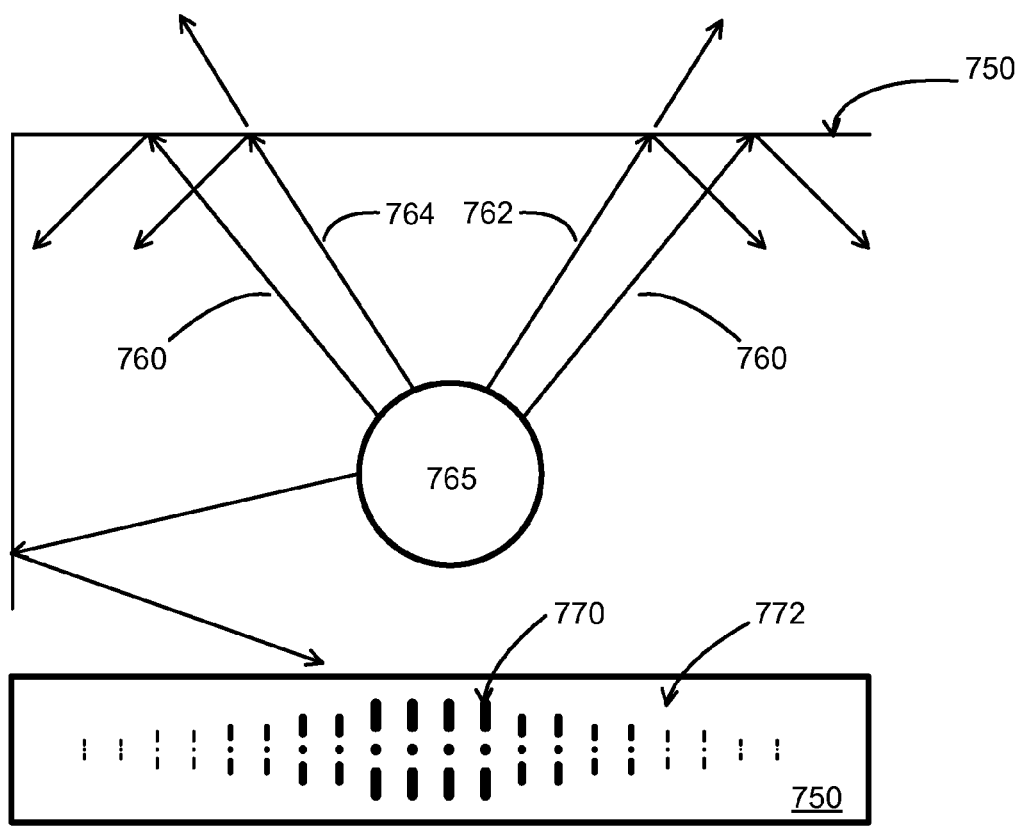
FIG. 7B is a drawing illustrating an ESR edge reflector with Gradient/Spatial Compensation according to an embodiment of the present invention.

Although potentially undesirable, as illustrated, all light 710 striking un-patterned ESR edge reflector 700 is reflected according to its angle of incidence. The effect can be reduced by the introducing edge reflectors which redirect light back into the optical cavity, and the present invention includes the provision of gradient/spatial compensation applied to edge reflectors. Such an arrangement, which may include selecting an amount and spacing of filters, absorption dots, transmission holes, or another form of light attenuation provides additional control of the PSF at the edges of a display and can be achieved both for color and/or luminance. FIG. 7B is a drawing illustrating an ESR edge reflector 750 with Gradient/Spatial Compensation, or patterned edge reflector, according to an embodiment of the present invention. Light from light source 765 striking reflector 750 is not equally, reflected. For example, light 760 striking an un-modified section of reflector 750 may be fully reflected. Light 762 striking an absorptive dot may, for example, be partially reflected and partially absorbed. Light 764 striking a color filter may be partially absorbed and partially reflected according to the filter type, angle of incidence, etc.

The end result is a modification and control of the PSF of the light source in accordance with the type of modifier and pattern of the edge reflector. Edge reflector 750 is illustrated as having a symmetrical pattern that may include absorptive dots, filters, transmission holes, or other materials, filters, or structures in any combination that provide a desired or more desirable PSF. The edge reflector may be embodied so as to capture or enhance either color and/or luminance. The edge reflectors can be of different heights, different angles, and different shapes (example flat wall or curved wall). The design of the dots/filters/holes on the edge reflectors can be done independently of the design on the flat reflector surrounding the LEDs or it can be done in conjunction with the design of the flat reflector.

Figure 7C:
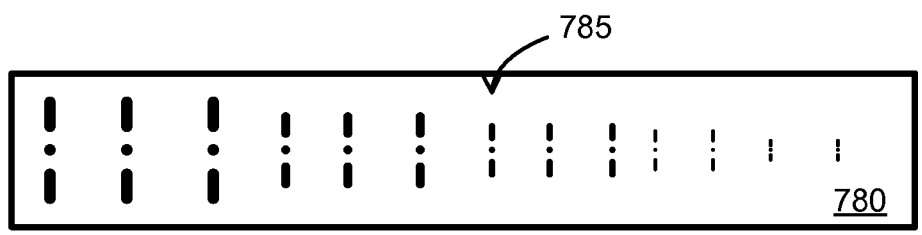
FIG. 7C is a drawing illustrating a reflector with a non-symmetric gradient according to an embodiment of the present invention.

In another example, FIG. 7C illustrates a reflector 780 with a non-symmetric gradient 785 having a higher concentration or larger area of "dots" in one area of the reflector (e.g., one end) compared to another area (e.g., an opposite end). The "dots" may be either reflective or absorptive depending on design considerations. When used as an edge reflector, the non-symmetric gradient 785 may be used to control how the light falls off as light progresses (e.g., progression toward an edge of the screen).

For example, a backlit LCD design may want a sharp fall-off at corners of a screen to mimic what a CRT does. In this case, the higher concentration of reflective dots would be further away from the corners (or a higher concentration of absorptive dots would be placed at the corners). In another example, a design may be for uniform luminance at the corners, in which case the higher concentration of reflective dots is placed at the corner to counteract "black hole" type effects at the corner—in the same case but when the reflector has absorptive rather than reflective dots, the smaller dots would then be placed towards the corner.

The gradient/spatial color compensation rear reflector could be used for both HDR RGB LED displays and non-HDR RGB LED displays. Similarly, the gradient/spatial luminance compensation rear reflector could be used for both HDR RGB or white LED displays and non-HDR white LED displays. All of these reflectors could be part of potential solutions to:

Reducing color fringing present in current RGB LEDs displays.

Providing an additional means of controlling the shape of the PSF.

Spatial consistency across the entire display (e.g. making an edge PSF similar to a center PSF).

controlling the tails of the PSF, which affects, for example, uniformity and/or contrast.

Providing additional control of the spatially uniformity of the display across an entire screen.

Reducing the thickness of the optical cavity of back-light driven LCD displays.

It should also be noted that the same techniques described herein as to reflectors, extends to any surface on which light may interact or be reflected. For example, in the case of a display, structural components such as posts, fasteners, and other items found within the optical cavity.

In various embodiments, a point spread function (PSF) of a light source is controlled by the provision of a PSF modifier on a reflector at or near the light source. The modifier may be a gradient or spatially varying application of any of transmission holes, filters, and absorptive dots. The invention may be applied to displays (e.g., backlighting of displays), and arrangement of the modifiers may include patterns that vary according to artifacts occurring in the display. The PSF modifier may, for example, flatten, remove or extend tails, or mitigate fringing colors or patterns. In backlight arrays, the PSF modifier may be similar for all centrally located light sources, and exhibit differences when applied to light sources near edges or other anomalies in the backlight or surrounding structure. The invention may be used by itself or in conjunction with color/luminance compensation on the LCD panel and/or color/luminance compensation on the LCD diffuser sheets and/or other forms of compensation. Although the present invention has been described herein mainly with reference to lighting for displays (e.g., LCD displays), it should be understood that the devices and processes of the present invention may be applied to other areas where specific control of PSFs is warranted.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing am absorptive dot or transmission hole, any other equivalent device, such as a material with appropriate reflectance/absorption qualities (e.g., a material having a similar reflectance absorption ratio as a pattern of dots and/or transmission holes), or other device having an equivalent function or capability, whether or not listed herein, may be substituted therewith. Furthermore, the inventor recognizes and hereby asserts that newly or subsequently developed technologies not now known may also be substituted for the described parts and still not depart from the scope of the present invention. All other described items, including, but not limited to reflectors, light sources, optical cavities, LED arrangements, colors, filters, transmission holes, display configurations and/or types, etc should also be considered in light of any and all available equivalents whether or not specifically described herein.

The present invention may suitably comprise, consist of, or consist essentially of, any of element (the various parts or features of the invention) and their equivalents. Further, the present invention illustratively disclosed herein may be practiced in the absence of any element, whether or not specifically disclosed herein, and specifically includes all combinations of the techniques that are described herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A display, comprising:
   a spatial modulator; and
   a backlight comprising at least one LED with a reflector configured to reflect light emitted by the LED towards the spatial modulator;
   wherein the reflector comprises sidewalls with transmission holes, and
   wherein the transmission holes are configured to capture some of the light emitted from the LED and thereby alter a Point Spread Function (PSF) of the LED illuminating the spatial modulator, where Point Spread Function (PSF) is a form or shape of light.

2. The display according to claim 1, wherein the transmission holes are positioned so as to surround the LED.

3. The display according to claim 1, wherein the transmission holes are of varying sizes.

4. The display according to claim 1, wherein the transmission holes are relatively smaller closer to the LED, and relatively larger further out on the reflector.

5. The display according to claim 1, wherein the transmission holes are relatively larger closer to the LED, and relatively smaller further out on the reflector.

6. The display according to claim 1, wherein the transmission holes are arranged in a pattern that is spatially varying and/or non-symmetrical near edges or corners of the backlight.

7. The display according to claim 1, wherein the reflector further comprises at least one of light absorptive dots and reflective dots.

8. An LED reflector, comprising:
   a base that is configured for carrying an LED;
   a plurality of sidewalls that are arranged surrounding the base, and, when the base carries an LED, configured to reflect light emitted from the LED in a generally uniform direction towards an intended target; and
   a gradient pattern of transmission holes in the sidewalls, configured such that light entering the transmission holes is removed from a Point Spread Function (PSF) of the light that is emitted by the LED for illuminating the intended target, where Point Spread Function (PSF) is a form or shape of light.

9. The LED reflector according to claim 8, wherein the gradient pattern comprises transmission holes that are relatively smaller closer to the base, and are relatively larger further out on the reflector.

10. The LED reflector according to claim 8, wherein the gradient pattern comprises transmission holes that are relatively larger closer to the base, and are relatively smaller further out on the reflector.

11. The LED reflector according to claim 8, wherein at least one of the size, shape, gradient, spatial pattern, density, and geometric parameters of the transmission holes is adapted to modify the illumination of the intended target.

12. The LED reflector according to claim 8, wherein an angle between the base and the sidewalls is adapted to modify the illumination of the intended target.

13. The LED reflector according to claim 8, wherein the transmission holes are spatially varying.

14. The LED reflector according to claim 8, further comprising at least one of light absorptive dots and reflective dots.

15. A backlight comprising an array of LEDs each comprising an LED reflector according to claim 8.

16. The backlight according to claim 15, wherein the transmission holes of the LED reflectors are arranged such that the backlight uniformly illuminates the intended target.

* * * * *